Dec. 14, 1954     C. K. GRAVLEY     2,696,651
PROCESS OF FORMING A CERAMIC BODY
Filed Feb. 24, 1951
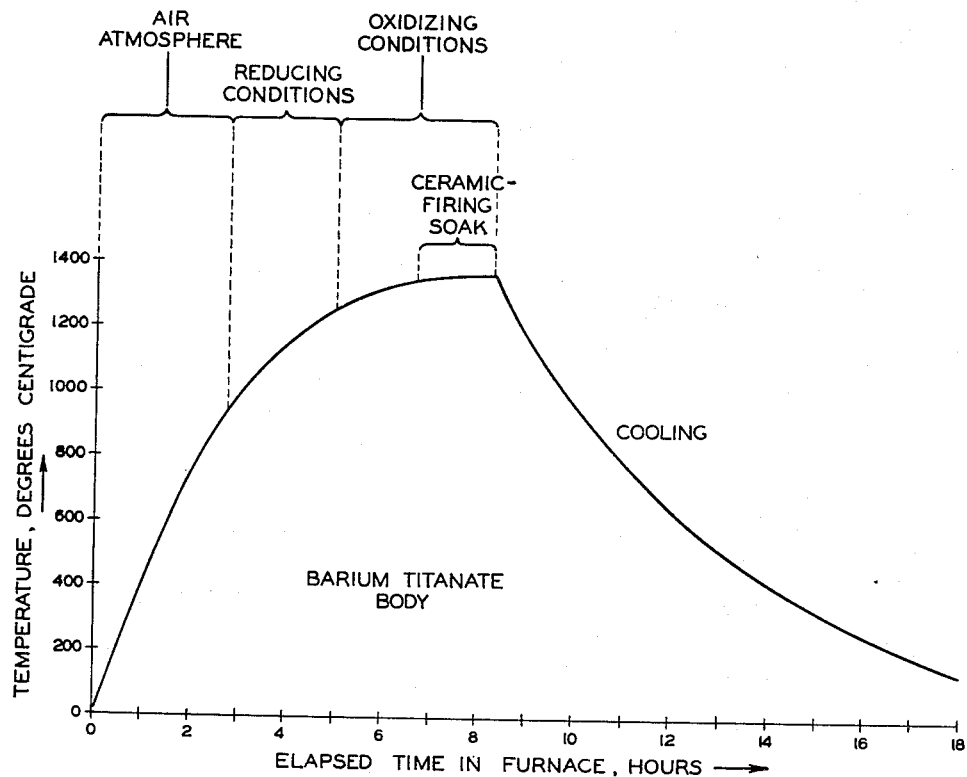
INVENTOR.
CHARLES K. GRAVLEY
BY
ATTORNEY

United States Patent Office 2,696,651
Patented Dec. 14, 1954

2,696,651
PROCESS OF FORMING A CERAMIC BODY

Charles K. Gravley, Lakewood, Ohio, assignor, by mesne assignments, to Clevite Corporation, Cleveland, Ohio, a corporation of Ohio Application February 24, 1951, Serial No. 212,684

9 Claims. (Cl. 25—156)

This invention relates to an improved process of forming a ceramic body and, more particularly, to a process of forming such a body containing primarily barium titanate. As used in this specification and in the appended claims, a body which contains primarily barium titanate is considered to comprise in its finished form about 95 mole percent or more barium titanate.

The usual ceramic-firing operation utilizes an oxidizing atmosphere or at least a non-reducing atmosphere. This is true especially in the firing for electrical use of ceramic bodies containing an easily reducible metal such as titanium, since the low resistivity and high power factor commonly resulting from an even slightly reduced condition deprive the fired body of some of its most useful dielectric properties. An exception has been made in certain brick-making operations, since it occasionally has been expedient to maintain the green clay in a reducing atmosphere at an early stage of the firing. However, this has no major effect on the structural properties of the fired brick and is resorted to for the purpose of eliminating soluble sulphates, which may effloresce and form the disfiguring scum sometimes seen on brick-faced structures.

It has been proposed that reducing conditions could be used during the firing of certain other ceramic products if high dielectric losses can be tolerated; the semi-conducting bodies formed in this way, however, are of very limited usefulness for electrical applications and are practically unusable if the dielectric body is to be placed in an energy-transducing circuit requiring efficient utilization of energy. Again, in the manufacture of whiteware, reducing conditions sometimes are used in the firing of hard porcelain. It also has been proposed to fire under reducing conditions a specific composition of titanium dioxide (titania) which includes additionally some nickel oxide, the nickel oxide in this particular case supposedly inhibiting the formation of the semi-conducting reduced form of titania. Ordinarily, however, and particularly with titaniferous dielectric bodies for electrical use, care is taken to avoid reducing conditions; in fact, it has been recommended to reheat such titania bodies after firing at high temperatures to permit replacement of oxygen which may be evolved during such firing even though neutral conditions are maintained.

Nevertheless, it has been found that, in ceramic-firing operations in which the bodies to be formed contain primarily barium titanate, a considerable and very beneficial improvement in the density and other physical and electrical properties of the fired body may be obtained by the maintenance of reducing conditions during an early stage of the heating cycle in the firing operation.

It is an object of this invention, therefore, to provide a new and improved process of forming a ceramic body containing primarily barium titanate which avoids one or more of the disadvantages of the prior art processes.

It is another object of the invention to provide a new and improved process of forming a ceramic body containing primarily barium titanate which permits the formation of bodies suitable for use as high voltage capacitors and having particularly advantageous characteristics for use as electromechanically sensitive elements.

It is a further object of this invention to provide a new and improved process of forming fired barium titanate bodies having high density, low porosity, and high electromechanical response.

In accordance with the invention, the process of forming a ceramic body containing primarily barium titanate comprises carrying an unfired mass of oxidic material containing roughly equimolar amounts of oxidic barium and oxidic titanium and free of oxides actively catalyzing reduction of barium titanate through a temperature cycle at one stage of which ceramic-firing temperatures are attained, and maintaining reducing conditions having a reducing potential equivalent to that of a fuel gas subjected to incomplete combustion to provide a carbon monoxide concentration of between about 0.2% and about 5.0% during a substantial portion of this temperature cycle above 600° C. but commencing substantially prior to the stage of ceramic-firing temperatures. The process further comprises forming the mass of material into a compact unitary body of predetermined shape at least prior to the stage of ceramic-firing temperatures, and maintaining this entire unitary body under oxidizing conditions during a substantial portion of the temperature cycle above 600° C. and subsequent to the aforementioned reducing portion thereof.

In accordance with another feature of the invention, the process of forming a ceramic body containing primarily barium titanate comprises heating a body of polycrystalline barium titanate material, containing a substantial amount of a sulfate compound such as barium sulfate but free of oxides actively catalyzing reduction of barium titanate, to elevated temperatures below ceramic-firing temperatures and subsequently subjecting the body to a ceramic-firing operation. A reducing atmosphere obtained by subjecting a fuel gas to incomplete combustion to provide a carbon monoxide concentration of between about 0.2% and about 5.0%, or an atmosphere having a reducing potential equivalent thereto, is maintained in the neighborhood of the body for a substantial period of time, at temperatures above 600° C. but commencing substantially prior to the aforesaid ceramic-firing operation, with reduction of the sulfur in the aforementioned sulfate compound and substantial elimination thereof in gaseous form. Under the specified reducing conditions there is formed during the ceramic-firing operation a body of high resistivity, and hence substantially unreduced, barium titanate ceramic having a density of at least 5.5.

For a better understanding of the present invention, together with other and further objects thereof, reference is had to the following description taken in connection with the accompanying drawing, and its scope will be pointed out in the appended claims.

The single figure of the drawing is a graphical representation of a typical temperature cycle used in forming a rather large ceramic body in accordance with the present invention, some of the conditions maintained at various stages of the process being indicated on the graph.

Barium titanate may be formed by the reaction of oxidic barium, combined as barium carbonate with titania. The process of the present invention may be practiced by carrying such an unfired mass of oxidic material containing roughly equimolar amounts of oxidic barium and oxidic titanium through a temperature cycle at one stage of which ceramic-firing temperatures are attained. Distinctly reducing conditions then are maintained during a substantial portion of this temperature cycle above 600° C. but commencing substantially prior to the stage of ceramic-firing temperatures. In such a case the barium carbonate and titania are heated together to form the barium titanate with evolution of carbon dioxide. This calcining operation, modified by the maintenance of the aforesaid distinctly reducing conditions, may be followed immediately by a compacting or pelleting procedure to form the mass of material into a compact, unitary body of predetermined shape. In any case this forming procedure must be carried out, of course, at least prior to the stage of ceramic-firing temperatures.

The compacted bodies then are heated to ceramic-firing temperatures to produce the finished fired titanate ceramic body. The entire unitary body is maintained under oxidizing conditions during a substantial portion of the temperature cycle above 600° C. and subsequent to the reducing portion of the cycle and still above 600° C. Although 600° C. is mentioned as a minimum temperature for the effective utilization of both reducing and oxidizing conditions, it will be understood that such chemical environments are more effective and act more quickly in the treatment of solid bodies at higher temperatures such as 800° C., and preferably above 1000° C.

While the reducing conditions called for by the process of the present invention may be maintained during, say, the latter part of a calcining operation and prior to the formation of a mass of fine particles into the shape of the desired barium titanate body, it is preferred first to form the raw or green material, already existing as barium titanate, into the body of predetermined shape. Subsequently there are carried out the heating and firing operations prescribed in accordance with the invention. Accordingly, in a preferred embodiment of the process of forming a ceramic body containing primarily barium titanate, an unfired mass of barium titanate is carried through the aforementioned temperature cycle during which reducing and then oxidizing conditions are maintained, the mass of this barium titanate material being formed into a compact body at least prior to the stage of ceramic-firing temperatures, and preferably preformed prior to the commencement of the temperature cycle.

The formation of the barium titanate in comminuted form into a compact body of the polycrystalline material having a predetermined shape may be carried out in any of various ways known to the art. It is customary first to form a suspension, slurry, or paste of the green material, which then can be used to prepare a body of desired shape by a conventional slip-casting, hydraulic-pressing, or extruding operation. Binders frequently are included with the green material, a dextrine or a gum such as ghatti being suitable.

The process of the present invention may be carried out with particular facility using thin shapes such as strips, sheets, or tubes of barium titanate material formed in accordance with my copending application Serial No. 32,588, filed June 12, 1948, and assigned to the same assignee as the present invention, now Patent No. 2,554,327, dated May 22, 1951. This application discloses and claims the method of making shapes of electromechanically sensitive ceramic material from an aqueous dispersion of a green material such as barium titanate which comprises applying a coagulating agent to an unrefractory form, causing contact between this agent and the titanate dispersion to coagulate a coating on the form, and heating to ceramic-firing temperatures to leave a coherent shape of the polycrystalline ceramic material.

While the thin shapes formed in the manner just described are particularly well suited for the heating and firing process of the present invention, it will be understood that the present process can be used economically and successfully with thick, bulky shapes. However, it will be appreciated that, when treating such thick bodies, a much more protracted temperature cycle may be required to insure the desired chemical and thermal conditions within the bodies.

The process as applied to relatively small or thin bodies may be carried out conveniently in a simple furnace which may have the form of a single chamber arranged for firing with illuminating gas. The body or bodies of raw barium titanate material is or are heated to ceramic-firing temperatures, distinctly reducing conditions being maintained for a substantial period of time while the body is being so heated. To accomplish this the furnace body may be heated with gas flames over a period of several hours using insufficient air for complete combustion. When the maturing or ceramic-firing temperature has been held for a suitable period, the firing is stopped and the furnace cools. Small furnaces may cool 400° C. to 600° C. in less than an hour. During the latter period in a preferred form of the process of the invention, after the firing under reducing conditions is stopped, air is permitted to circulate in the furnace, so that oxidizing conditions are maintained for a substantial period of time before the body has cooled to temperatures much less elevated than the ceramic-firing temperatures.

Small barium titanate bodies, for example disks having a thickness of the order of an eighth of an inch and a diameter of an inch or so, may be treated in such a small furnace with only about one hour for the heating and about one hour for the cooling. However, longer temperature cycles ordinarily are required, and different equipment is indicated, if pressed or extruded bodies having wall thicknesses of the order of a fourth or a half an inch are to be treated. Still thicker bodies may be processed with correspondingly longer heating cycles.

By way of further example, the process of the present invention now will be described for the rather more extended treatment of thicker or larger bodies, and reference will be made during this description to the single figure of the drawing. In this figure the approximate elapsed time after the temperature cycle commences is plotted against the temperature prevailing at and around the barium titanate bodies. The bodies are distributed on suitable supports or saggers within a furnace. The conditions existing within the furnace and the operations being carried out therein are designated briefly on the regions of the graph pertaining to the corresponding stage or time period of the process.

For the uniform heating and chemical treatment of such larger bodies a muffle furnace may be used. The bodies are placed within the muffle, while the surrounding space in the furnace may be gas-fired. A number of vents conveniently are provided in the opposite walls of the muffle and communicating with the space external of the furnace. The bodies of raw barium titanate material are heated to elevated temperatures below ceramic-firing temperatures and subsequently are subjected to a ceramic-firing operation. To maintain distinctly reducing conditions in the neighborhood of the bodies for a substantial period of time after the bodies have been heated to temperatures above 600° C. but commencing substantially prior to the ceramic-firing operation, and preferably during a substantial portion of the heating to the aforementioned elevated temperatures, illuminating gas, together with air in quantities insufficient for complete combustion, is admitted to the interior of the muffle itself through the vents. The major amount of heat is supplied from outside the muffle. Indeed, air alone is passed through the vents in the muffle below about 950° C., during which time binder material in the body burns out and is scavenged by the air streams. The presence of an air atmosphere within the furnace during this initial heating period is indicated on the graph of the drawing. Above this temperature non-explosive combustion is assured within the muffle, and the oxygen-poor mixture burns therein until the temperature reaches about 1250° C. This stage of the temperature cycle is designated in the drawing as involving reducing conditions. Four to five hours, for example, may be required to reach the 1250° temperature.

At this point the supply of gas into the muffle is stopped, and thereafter air is forced through the vents into the muffle to maintain oxidizing conditions, as indicated in the drawing, during a substantial portion, in this case all, of the ceramic-firing operation. The furnace is fired until the interior of the muffle is carried to the maturing temperature of the ceramic body, which may be in the neighborhood of 1370° C. It may take 1½ to 2 hours to reach this temperature, which is held for 1 to 2 hours, the approximate time period for the last-mentioned stage of the process being designated as the ceramic-firing soak in the drawing. Firing is then stopped and the furnace cooled until the fired bodies can be removed; even with forced cooling this may take some 12 hours. The process carried out in this way results in the formation of a high resistivity barium titanate body having a density of at least 5.5.

In the examples discussed, the reducing agent is a commercial illuminating or fuel gas such as the usual purified natural gas or coal gas. Such gas either contains large amounts of carbon monoxide as supplied from the mains, or develops carbon monoxide as a result of the incomplete combustion of hydrocarbon. The concentration of carbon monoxide in a furnace chamber in which such a gas is burning is determined, of course, by the relative amounts of combustible gas and atmospheric oxygen supplied. The theoretical or calculated concentration of carbon monoxide may be checked by an Orsat analyzer. About 0.2% carbon monoxide may be sufficient, while concentrations of above about 5% should be avoided because of the tendency to form soot. Concentrations of carbon monoxide within this approximate range may be designated distinctly but mildly reducing conditions. A concentration of 0.5% CO has been found to be quite effective during the reducing portions of the temperature cycle. Other reducing atmospheres having roughly equivalent reducing potentials as compared with the carbon monoxide concentrations just mentioned may be equally effective, and the invention may be carried out using hydrogen gas in the furnace chamber to establish the distinctly reducing conditions which are required. In any case, the reducing conditions, as indicated hereinabove, should have a reducing potential equivalent to that of the above-mentioned fuel gases when subjected to incomplete combustion to provide a carbon monoxide concentration of between about 0.2% and about 5.0%.

A typical material which may be employed in powdered form in the process of the invention has the following approximate analysis in percentages by weight:

| | |
|---|---|
| $BaTiO_3$ | 92.4 |
| $TiO_2$ | 1.6 |
| $SiO_2$ | 0.3 |
| $BaCO_3$ | 4.0 |
| $BaSO_4$ | 0.8 |
| | 99.1 |

The remainder comprises fractional percentages in oxidized forms of alkaline earth, alkali, and other elements, such as aluminum, sodium, magnesium, and calcium, of which alumina frequently comprises more than half of the remainder. In carrying out the process of the present invention, it is preferred that the oxidic material utilized contain less than one percent by weight of any metallic substances, expressed as oxides, other than oxidic barium and titanium. Reference to the patent to R. R. Roup et al., No. 2,520,376, patented August 29, 1950, indicates that the ease of reduction of the barium titanate in such ceramic bodies is increased greatly by the addition to the titanate raw material of small amounts, such as 0.5%, of a reducing catalyst in the form of a rare earth oxide, or mixtures of rare earth oxides, or thorium oxide. A typical analysis of a barium titanate material, such as that given hereinabove for use in the process of the invention, shows that these typical materials are free of such oxides actively catalyzing reduction of barium titanate.

Referring to the typical composition given above, it will be seen that the composition contains about enough barium carbonate to provide, upon decomposition into barium oxide and carbon dioxide, sufficient barium oxide to combine with the titania, which presumably exists uncombined in the starting composition. Thus the barium carbonate is decomposed during the heating or firing by the usual calcining effect of the elevated temperatures. There is evidence, however, that the barium sulfate, or at least some of it, often is not decomposed in this way. The practice of the present process is not dependent upon a theory or rationale of its mode of operation. However, without limiting the scope of the invention in any way through such theoretical considerations, it appears that some of the beneficial effects of the present process, when the raw material contains a substantial amount of a sulfate compound such as barium sulfate, result from the reduction in the portion of the temperature cycle during which the reducing conditions are maintained, and elimination as gaseous sulfur dioxide or hydrogen sulfide, of the sulfur in the barium sulfate. Although the chemical analysis may present some difficulties, this or a similar sulfate is present in most titanate raw materials. At times sulfate sulfur also may be introduced into the raw material with an addition agent added thereto in preparing the body of raw material in the desired shape, for example, an agent used to stabilize an aqueous suspension of the green material. While the invention is not limited to the treatment of materials of a given composition, it is believed that its beneficial effects are more pronounced when treating materials containing a sulfate such as barium sulfate.

While there have been described what at present are considered to be the preferred embodiments of this invention, it will be obvious to those skilled in the art that various changes and modifications may be made therein without departing from the invention. It is aimed, therefore, in the appended claims to cover all such changes and modifications which fall within the true spirit and scope of the invention.

What is claimed is:

1. The process of forming a ceramic body containing primarily barium titanate, comprising: carrying an unfired mass of oxidic material containing roughly equimolar amounts of oxidic barium and oxidic titanium and free of oxides actively catalyzing reduction of barium titanate through a temperature cycle at one stage of which ceramic-firing temperatures are attained; maintaining reducing conditions having a reducing potential equivalent to that of a fuel gas subjected to incomplete combustion to provide a carbon monoxide concentration of between about 0.2% and about 5.0% during a substantial portion of said temperature cycle above 600° C. but commencing substantially prior to said stage of ceramic-firing temperatures; forming said mass of material into a compact unitary body of predetermined shape at least prior to said stage of ceramic-firing temperatures; and maintaining said entire unitary body under oxidizing conditions during a substantial portion of said temperature cycle above 600° C. and subsequent to said reducing portion thereof.

2. The process of forming a dense, non-porous ceramic body of barium titanate, comprising: carrying an unfired mass of oxidic material containing substantially equimolar amounts of oxidic barium and oxidic titanium, containing less than one percent by weight of any other metallic substances expressed as oxides, and free of oxides actively catalyzing reduction of barium titanate, through a temperature cycle at one stage of which ceramic-firing temperatures are attained; maintaining reducing conditions having a reducing potential equivalent to that of a fuel gas subjected to incomplete combustion to provide a carbon monoxide concentration of between about 0.2% and about 5.0% during a substantial portion of said temperature cycle above 600° C. but commencing substantially prior to said stage of ceramic-firing temperatures; forming said mass of material into a compact unitary body of predetermined shape at least prior to said stage of ceramic-firing temperatures; and maintaining said entire unitary body under oxidizing conditions during a substantial portion of said temperature cycle above 600° C. and subsequent to said reducing portion thereof.

3. The process of forming a ceramic body containing primarily barium titanate, comprising: carrying an unfired mass of barium titanate material free of oxides actively catalyzing reduction of barium titanate through a temperature cycle at one stage of which ceramic-firing temperatures are attained; maintaining reducing conditions having a reducing potential equivalent to that of a fuel gas subjected to incomplete combustion to provide a carbon monoxide concentration of between about 0.2% and about 5.0% during a substantial portion of said temperature cycle above 600° C. but commencing substantially prior to said stage of ceramic-firing temperatures; forming said mass of material into a compact unitary body of predetermined shape at least prior to said stage of ceramic-firing temperatures; and maintaining said entire unitary body under oxidizing conditions during a substantial portion of said temperature cycle above 600° C. and subsequent to said reducing portion thereof.

4. The process of forming a ceramic body containing primarily barium titanate, comprising: heating a unitary body of raw barium titanate material free of oxides actively catalyzing reduction of barium titanate to elevated temperatures below ceramic-firing temperatures and subsequently subjecting said body to a ceramic-firing operation; maintaining reducing conditions having a reducing potential equivalent to that of a fuel gas subjected to incomplete combustion to provide a carbon monoxide concentration of between about 0.2% and about 5.0% for a substantial period of time after said body has been heated to temperatures above 600° C. but commencing substantially prior to said ceramic-firing operation; and maintaining said entire unitary body under oxidizing conditions during a substantial portion of said ceramic-firing operation.

5. The process of forming a ceramic body containing primarily barium titanate, comprising: heating a unitary body of raw barium titanate material free of oxides actively catalyzing reduction of barium titanate to elevated temperatures below ceramic-firing temperatures and subsequently subjecting said body to a ceramic-firing operation; maintaining reducing conditions having a reducing potential equivalent to that of a fuel gas subjected to incomplete combustion to provide a carbon monoxide concentration of between about 0.2% and about 5.0% for a substantial period of time after said body has been heated to temperatures above 600° C. but commencing substantially prior to said ceramic-firing operation; and maintaining said entire unitary body under oxidizing conditions during a substantial portion of said ceramic-firing operation with the formation of a high resistivity barium titanate body having a density of at least 5.5.

6. The process of forming a ceramic body containing primarily barium titanate, comprising: heating a body of raw barium titanate material free of oxides actively catalyzing reduction of barium titanate to elevated temperatures below ceramic-firing temperatures and maintaining reducing conditions having a reducing potential equivalent to that of a fuel gas subjected to incomplete combustion to provide a carbon monoxide concentration of between about 0.2% and about 5.0% in the neighborhood of said body during a substantial portion of said heating; and subsequently subjecting said entire body to a ceramic-firing operation under oxidizing conditions.

7. The process of forming a ceramic body containing primarily barium titanate, comprising: heating a unitary body of raw barium titanate material free of oxides actively catalyzing reduction of barium titanate to ceramic-firing temperatures, maintaining said unitary body under a reducing atmosphere, obtained by subjecting a fuel gas to incomplete combustion to provide a carbon monoxide concentration of between about 0.2% and about 5.0%, for a substantial period of time while said body is being so heated, and subsequently maintaining said entire unitary body under oxidizing conditions for a substantial period of time before said body has cooled to much less elevated temperatures.

8. The process of forming a ceramic body containing primarily barium titanate, comprising: heating a preformed body of raw barium titanate material containing a substantial amount of barium sulfate but free of oxides actively catalyzing reduction of barium titanate to elevated temperatures below ceramic-firing temperatures and subsequently subjecting said body to a ceramic-firing operation, and maintaining reducing conditions having a reducing potential equivalent to that of a fuel gas subjected to incomplete combustion to provide a carbon monoxide concentration of between about 0.2% and about 5.0% for a substantial period of time at temperatures above 600° C. but commencing substantially prior to said ceramic-firing operation with reduction of said sulfate sulfur and substantial elimination thereof in gaseous form but without substantial reduction of said barium titanate.

9. The process of forming a ceramic body containing primarily barium titanate, comprising: heating a body of polycrystalline barium titanate material, containing a substantial amount of a sulfate compound but free of oxides actively catalyzing reduction of barium titanate, to elevated temperatures below ceramic-firing temperatures and subsequently subjecting said body to a ceramic-firing operation; and maintaining a reducing atmosphere obtained by subjecting a fuel gas to incomplete combustion to provide a carbon monoxide concentration of between about 0.2% and about 5.0% in the neighborhood of said body for a substantial period of time, at temperatures above 600° C. but commencing substantially prior to said ceramic-firing operation, with reduction of the sulfur in said sulfate compound and substantial elimination thereof in gaseous form and with formation during said ceramic-firing operation of a high resistivity barium titanate ceramic body having a density of at least 5.5.

References Cited in the file of this patent

UNITED STATES PATENTS

| Number | Name | Date |
|---|---|---|
| 2,140,222 | Espenschied | Dec. 13, 1938 |
| 2,140,235 | Lederle | Dec. 13, 1938 |
| 2,140,236 | Lederle | Dec. 13, 1938 |
| 2,520,376 | Roup et al. | Aug. 29, 1950 |
| 2,529,719 | Wentworth | Nov. 14, 1950 |

FOREIGN PATENTS

| Number | Country | Date |
|---|---|---|
| 467,113 | Great Britain | Jan. 5, 1937 |
| 548,651 | Great Britain | Oct. 19, 1942 |
| 553,098 | Great Britain | May 7, 1943 |